(12) United States Patent
Mueller-Haas

(10) Patent No.: US 10,066,526 B2
(45) Date of Patent: Sep. 4, 2018

(54) EXHAUST GAS LINE SECTION FOR SUPPLYING LIQUID ADDITIVE

(71) Applicant: CONTINENTAL AUTOMOTIVE GMBH, Hannover (DE)

(72) Inventor: Klaus Mueller-Haas, Cologne (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/767,797

(22) PCT Filed: Jan. 27, 2014

(86) PCT No.: PCT/EP2014/051495
§ 371 (c)(1),
(2) Date: Aug. 13, 2015

(87) PCT Pub. No.: WO2014/124797
PCT Pub. Date: Aug. 21, 2014

(65) Prior Publication Data
US 2015/0377104 A1    Dec. 31, 2015

(30) Foreign Application Priority Data
Feb. 14, 2013    (DE) .................. 10 2013 101 461

(51) Int. Cl.
*F01N 3/20* (2006.01)
*F01N 3/28* (2006.01)

(52) U.S. Cl.
CPC ............. *F01N 3/206* (2013.01); *F01N 3/208* (2013.01); *F01N 3/2066* (2013.01);
(Continued)

(58) Field of Classification Search
CPC ........ F01N 3/206; F01N 3/2066; F01N 3/208; F01N 3/2803; F01N 3/2892;
(Continued)

(56) References Cited

U.S. PATENT DOCUMENTS

2007/0051097 A1*  3/2007  Klein .................... B01D 53/90
                                                                60/286
2009/0019843 A1   1/2009  Levin et al.
(Continued)

FOREIGN PATENT DOCUMENTS

CN          101815851         8/2010
DE          199 13 462 A1     9/2000
(Continued)

OTHER PUBLICATIONS

Office Action dated Nov. 17, 2016 which issued in the corresponding Russian Patent Application No. 201539005/06(059806).
(Continued)

*Primary Examiner* — Brandon Lee
(74) *Attorney, Agent, or Firm* — Cozen O'Connor

(57) ABSTRACT

An exhaust gas line section, through which an exhaust gas can flow, includes a flow guiding structure, a feed unit configured to supply a liquid additive to the exhaust gas, and a permeable impingement structure, the flow guiding structure, the feed unit, and the permeable impingement structure being positioned one behind the other in the flow direction. The feed unit and the flow guiding structure are arranged and configured such that an impingement region of the liquid additive on the impingement structure overlaps the center of gravity of a flow distribution of the exhaust gas flowing through the impingement structure.

10 Claims, 4 Drawing Sheets

(52) U.S. Cl.
    CPC ......... *F01N 3/2803* (2013.01); *F01N 3/2892* (2013.01); *F01N 2240/20* (2013.01); *F01N 2240/40* (2013.01); *F01N 2330/30* (2013.01); *F01N 2470/20* (2013.01); *F01N 2470/30* (2013.01); *F01N 2510/14* (2013.01); *F01N 2610/14* (2013.01); *Y02A 50/2325* (2018.01); *Y02T 10/24* (2013.01)

(58) Field of Classification Search
    CPC ............. F01N 2240/20; F01N 2240/40; F01N 2330/30; F01N 2470/20; F01N 2470/30; F01N 2510/14; F01N 2610/14; Y02T 10/24
    See application file for complete search history.

(56)  References Cited

U.S. PATENT DOCUMENTS

| | | |
|---|---|---|
| 2009/0158718 A1 | 6/2009 | Kimura et al. |
| 2010/0196225 A1* | 8/2010 | Harinath ............... F01N 3/2066 422/187 |
| 2010/0212292 A1 | 8/2010 | Rusch et al. |
| 2011/0225952 A1 | 9/2011 | Witte-Merl et al. |
| 2012/0073272 A1* | 3/2012 | Vanvolsem ......... B01F 3/04049 60/295 |
| 2012/0263632 A1 | 10/2012 | Campbell et al. |
| 2014/0366513 A1 | 12/2014 | Mueller-Haas et al. |

FOREIGN PATENT DOCUMENTS

| | | |
|---|---|---|
| DE | 19938854 | 1/2001 |
| DE | 10 2005 063081 | 7/2007 |
| EP | 1 750 284 | 3/2007 |
| EP | 2 090 761 A1 | 8/2009 |
| EP | 2339139 | 6/2011 |
| RU | 2410551 | 1/2011 |
| WO | WO 2006/097131 A1 | 9/2006 |
| WO | WO 2010/146412 | 12/2010 |
| WO | WO 2012/052690 A1 | 4/2012 |
| WO | WO 2013/127955 A1 | 9/2013 |

OTHER PUBLICATIONS

Office Action dated Feb. 28, 2017 which issued in the corresponding Chinese Patent Application No. 201480019378.4.

* cited by examiner

EXHAUST GAS LINE SECTION FOR SUPPLYING LIQUID ADDITIVE

CROSS-REFERENCE TO RELATED APPLICATIONS

This is a U.S. national stage of application No. PCT/EP2014/051495, filed on 27 Jan. 2014, which claims priority to the German Application No. DE 10 2013 101 461.5 filed 14 Feb. 2013, the content of both incorporated herein by reference.

BACKGROUND OF THE INVENTION

1. Field of the Invention

The invention relates to an exhaust gas line section for supplying a liquid additive into an exhaust gas treatment device. An exhaust gas line section of this type can be arranged in an exhaust gas line or in an exhaust gas treatment device and is flowed through by the exhaust gas during operation of an internal combustion engine connected to the exhaust gas line or to the exhaust gas treatment device. A liquid additive can be supplied to an exhaust gas flow by way of the described exhaust gas line section.

2. Related Art

Exhaust gas treatment devices to which a liquid additive is supplied are widespread. In exhaust gas treatment devices of this type, the exhaust gas purification method of selective catalytic reduction (SCR) is implemented, for example. In the method, nitrogen oxide compounds in the exhaust gas are reduced with the aid of a reducing agent. Ammonia is used, in particular, as a reducing agent. Ammonia is often not supplied directly to an exhaust gas treatment device, however, but rather in the form of a reducing agent precursor solution. The reducing agent precursor solution is a liquid additive which can be supplied to an exhaust gas flow by way of the described exhaust gas line section.

Urea-water solution is used particularly frequently as a liquid additive for the exhaust gas purification. A urea-water solution with a urea content of 32.5% is available under the trade name AdBlue®.

During the metering, i.e., injection, of liquid additive to the exhaust gas treatment device, it is a problem that the liquid additive very readily forms deposits in the exhaust gas treatment device. For example, the urea-water solution has to evaporate rapidly during the supply to an exhaust gas treatment device, in order that no crystalline urea particles are formed. Moreover, a homogeneous distribution of the liquid additive in the exhaust gas flow is aimed for during the supply. By way of a homogeneous distribution of the liquid additive, the formation of deposits can be avoided because a spatially restricted enrichment of the exhaust gas with liquid additive does not occur. Local enrichment can lead to the formation of relatively large additive droplets, which do not evaporate or evaporate only with difficulty and increase the formation of deposits.

In order to avoid deposits, the liquid additive should not, in particular, come into contact with an outer wall of the exhaust gas treatment device during the supply. The outer wall is often directly in contact with the surroundings, with the result that it is loaded with the external temperature from an outer side. Accordingly, the outer wall is often very much colder than other regions of the exhaust gas treatment device, which are spaced apart from the outer wall. Liquid additive can therefore condense on the wall of the exhaust gas line or cannot condense (rapidly enough) and can thus frequently lead to deposits (which cannot be removed or can be removed only with difficulty).

SUMMARY OF THE INVENTION

Taking this as a starting point, it is an object of the present invention to solve or at least alleviate the technical problems highlighted in connection with the prior art. In particular, a particularly advantageous exhaust gas line section is to be described, by way of which a liquid additive can be supplied to an exhaust gas treatment device.

An exhaust gas line section is accordingly proposed which can be flowed through by an exhaust gas, a flow guiding structure, a metering unit, e.g., a metering nozzle and/or valve for feeding a liquid additive to the exhaust gas, and an impingement structure, through which flow can pass, being arranged behind one another along a throughflow direction, the metering unit and the flow guiding structure being arranged and configured in such a way that an impingement region of the liquid additive on the impingement structure overlaps with the centroid of a flow distribution of the exhaust gas which flows through the impingement structure.

The exhaust gas line section is preferably a pipe that forms a section of an exhaust gas line of an exhaust gas treatment device and through which the exhaust gas flows (as an exhaust gas flow). The exhaust gas line section preferably has an outer wall that delimits the exhaust gas line section, an inflow side, through which the exhaust gas flow enters into the exhaust gas line section, and an outflow side, through which the exhaust gas flow exits out of the exhaust gas line section. The throughflow direction extends through the exhaust gas line section from the inflow side to the outflow side. The exhaust gas line section has a cross section or a cross-sectional area which is oriented, in particular, substantially perpendicularly with respect to the throughflow direction. The exhaust gas line section preferably has a cylindrical basic shape, the outer wall forming the circumferential face of the cylindrical basic shape, and the inflow side and the outflow side being formed in each case by the end sides of the cylindrical basic shape. The fact that the flow guiding structure, the metering unit and the impingement structure are arranged behind one another in the throughflow direction means, in particular, that that three components lie in each case in a plane (cross-sectional plane) which is oriented normally or perpendicularly with respect to the throughflow direction, and the respective cross-sectional planes of the three different components are arranged behind one another in the throughflow direction.

The flow guiding structure is arranged on the inflow side of the exhaust gas line section. The flow guiding structure influences the exhaust gas flow, which flows through the exhaust gas line section from the inflow side to the outflow side. For example, the flow can be concentrated, widened and/or at least partially deflected by the flow guiding structure. The flow guiding structure is arranged, in particular, so as to be immediately adjacent to the inflow side and/or forms the first component of the exhaust gas line section. The flow guiding structure is, in particular, an assembly part, that is to say a separate component, of the exhaust gas line section.

The (at least one) metering unit for supplying a liquid additive to the exhaust gas line section preferably comprises a nozzle, by way of which the liquid additive can be injected into the exhaust gas line section. The nozzle is very particularly preferably an atomizing nozzle which finely atomizes the liquid additive during supplying. The metering unit is arranged at a (lateral) opening of the exhaust gas line section. The opening penetrates the outer wall of the exhaust gas line section, with the result that, in addition to the inlet opening and the outlet opening, (at least) a third opening is also provided in the outer wall of the exhaust gas line section, to which third opening the metering unit is connected. The third opening is closed by the metering unit, however. In one design variant, the metering unit also comprises an injector, by way of which metering of the liquid additive is possible. The injector preferably has an electrically opening and closing metering valve, and the supplied quantity of liquid additive can be fixed via the opening time of the injector. The atomizing nozzle preferably directly adjoins the injector and extends at least in sections into the exhaust gas line section. Furthermore, it is preferred that the metering unit opens on the outer wall, that is to say, in particular, does not protrude or protrudes only to a minimum extent inward beyond the outer wall. Furthermore, it is preferred that the metering unit is arranged so as to immediately follow the flow guiding structure, that is to say no further components are arranged in between here.

The impingement structure is arranged close to or on the outflow side of the exhaust gas line section. The impingement structure, through which flow can pass, is a structure that is struck by liquid additive supplied to the exhaust gas by the metering unit. The impingement structure preferably completely spans a cross-sectional area of the exhaust gas line section.

Accordingly, an exhaust gas flow in the exhaust gas line section has to flow through the impingement structure. It is preferred that the impingement structure is arranged so as to immediately follow the metering unit, that is to say no further components are arranged in between here. It is likewise preferred that no further component follows toward the outflow side, that is to say the impingement structure is the last component of the exhaust gas line section in the throughflow direction. Furthermore, it is preferred that the impingement structure is a separate component within the exhaust gap line section (a type of assembly part).

The impingement region is a region on the impingement structure that the liquid additive strikes when it is supplied to the exhaust gas line section by way of the metering unit. The impingement region is preferably arranged on a surface of the impingement structure, which surface faces the metering unit. The surface can be divided into an impingement region and a peripheral region. The peripheral region is that part of the surface of the impingement structure that does not belong to the impingement region. The impingement region is preferably a region spaced apart from an outer wall of the exhaust gas line section. It can thus be avoided that liquid additive strikes the impingement structure in the impingement region also comes into contact with the outer wall of the exhaust gas line section. Deposits might be formed as a result.

The impingement region is predefined by the design and method of operation of the metering unit and by the spatial arrangement of the metering unit relative to the impingement structure. The metering unit is preferably operated at a predefined pressure. This means that the metering unit is supplied by a delivery unit with liquid additive which is at a predefined pressure. A nozzle of the metering unit preferably has a predefined spray cone. The design of the predefined spray cone is as a rule dependent on the predefined pressure. The nozzle atomizes the liquid additive during supplying, and the predefined spray cone of liquid additive is formed in the exhaust gas line section. The predefined spray cone has a defined orientation and a defined widening angle. The widening angle can be, for example, between 5 and 30° [angular degrees]. The orientation of the spray cone can be described by a (central) axis of the spray cone. The axis of the spray cone is preferably oriented toward the impingement structure. If the orientation or the axis of the spray cone and the widening angle are fixed correspondingly and the impingement structure is arranged correspondingly in the exhaust gas line section, the impingement region for the liquid additive is formed correspondingly on the impingement structure.

The metering unit and the flow guiding structure are configured such that the impingement region of the liquid additive on the impingement structure overlaps with the centroid of a flow distribution of the exhaust gas which flows through the impingement structure. The flow distribution flows through the impingement structure and/or the impingement structure is flowed onto by the flow distribution. The centroid of the flow distribution is a centroid of a speed distribution of the flow in a cross-sectional area of the exhaust gas line section, in which cross-sectional area the impingement region on the impingement structure also lies. The centroid of the flow distribution can coincide with that point in the cross-sectional area, at which the greatest exhaust gas flow speed prevails when an exhaust gas flow flows through the exhaust gas line section. The fact that the impingement region and the centroid of the flow distribution overlap means that the centroid lies in the impingement region.

The impingement region likewise has a centroid. The centroid of the impingement region is preferably the area center of the area of the impingement region. The distribution of the liquid additive to the area of the impingement region can be homogeneous. The quantity related to the area of liquid additive which strikes the impingement region is then identical at every point of the impingement region. It is also possible that the liquid additive is distributed inhomogeneously in the impingement region. For example, the quantity related to the area of liquid additive that strikes the impingement region can be greater in some regions than in other regions of the impingement region. Under these conditions, the centroid of the impingement region can differ from the area center of the area of the impingement region. According to one preferred design variant, the centroid of the impingement region and the centroid of the flow distribution on the impingement structure lie above one another. This means, in particular, that the centroids are at a spacing from one another of less than 10 mm [millimeters], particularly preferably even less than 5 mm.

The metering unit can be arranged on a protuberance of the exhaust gas line section. Here, a protuberance means a region of the exhaust gas line section that deviates toward the outside from a cylindrical basic shape of the pipeline section and thus enlarges the volume of the exhaust gas line section.

The metering unit can also be arranged on an indentation of the exhaust gas line section. An indentation is an invagination of the wall of the exhaust gas line section that reduces the volume of the exhaust gas line section and therefore likewise deviates from a cylindrical basic shape of the exhaust gas line section. By way of focussing of the exhaust gas in accordance with a flow distribution that corresponds to an impingement region, a peripheral region is produced around the impingement region. Only low exhaust gas flow speeds occur in the peripheral region. An indentation in the region does not impede the exhaust gas flow or impedes it only to a very small extent. As a result of the indentation, a section of the metering unit arranged outside the exhaust gas line section does not protrude or protrudes only a little beyond the cylindrical basic shape of the exhaust gas line section. An indentation therefore makes a very compact exhaust gas line section with a metering unit possible.

The described exhaust gas line section makes it possible firstly that deposits of liquid additive in the region of a metering unit for liquid additive are avoided effectively. Firstly, the liquid region strikes a structure only in a clearly delimited region within the exhaust gas line section (the impingement region). At the same time, rapid and effective transporting away of the
liquid additive in the impingement region is realized by way of the correspondingly provided flow distribution. The flow distribution causes the exhaust gas flow to evaporate, chemically transform and/or transport away the liquid additive particularly effectively and/or rapidly.

The metering unit and the flow guiding structure are particularly preferably arranged and configured such that the impingement region corresponds to the flow distribution.

The flow distribution corresponds to the impingement region, in particular, when the flow speed and/or the mass flow related to the area of the exhaust gas flow in the impingement region differs significantly from the flow speed or the mass flow by area of the exhaust gas flow outside the impingement region. The exhaust gas preferably flows in the impingement region at a first exhaust gas flow speed, whereas the exhaust gas flows outside the impingement region (in the peripheral region of the impingement structure) at a second (significantly different) exhaust gas flow speed. The first exhaust gas flow speed and the second exhaust gas flow speed are in each case mean flow speeds related to the area which the exhaust gas exhibits in the respective regions (the impingement region and the peripheral region). The first exhaust gas flow speed is preferably at least two times and particularly preferably at least five times the second exhaust gas flow speed.

The flow speeds of the exhaust gas are preferably greatly different in the border region between the impingement region and the peripheral region. A flow distribution profile preferably has a steep flank between the impingement region and the peripheral region. At least 80 percent of the area of the impingement region is preferably flowed through or flowed onto at a flow speed which is at least 90 percent of the (mean) first flow speed. At least 80 percent of the area of the peripheral region is preferably flowed through or flowed onto at flow speed which is at most 110 percent of the (mean) second flow speed. One described embodiment of a flow distribution can be achieved by a suitable design of the flow guiding structure.

The exhaust gas line section is advantageous, furthermore, if the impingement structure is a flow straightener.

A flow straightener is preferably distinguished by a multiplicity of duct structures that run in parallel. Turbulence is reduced significantly in an exhaust gas flow that flows through a flow straightener. The flow straightener chops up eddies that prevail in the exhaust gas flow. A flow straightener as impingement structure therefore makes it possible for the exhaust gas line section to provide a homogeneous exhaust gas flow enriched with finely atomized liquid additive or liquid additive that has already evaporated. The ducts of a flow straightener are preferably so long that an exhaust gas flow that leaves the flow straightener has approximately parallel flow paths and/or is laminar.

In one design variant, the flow straightener is of conical design. A flow straightener of this type has ducts that at least partially run together (toward one another) or apart (away from one another). A conical flow straightener typically has a small end side and a large end side. The small end side is particularly preferably oriented toward the metering unit. The impingement region further preferably corresponds to the small end side. The exhaust gas flow can then be straightened and additionally widened in the flow straightener, in order that the flow is again distributed homogeneously over the entire cross section of an exhaust gas line downstream of the flow straightener in the throughflow direction.

The exhaust gas line section is advantageous, furthermore, if the impingement structure comprises an exhaust gas mixer.

Particularly satisfactory swirling of the exhaust gas can take place by way of an exhaust gas mixer. This can ensure particularly satisfactory thorough mixing of liquid additive and exhaust gas, with the result that there is an exhaust gas flow downstream of the exhaust gas line section, in which exhaust gas flow the liquid additive is distributed homogeneously. The exhaust gas flow preferably flows onto the impingement structure configured as an exhaust gas mixer in accordance with the described flow distribution. The exhaust gas flow is then swirled and mixed thoroughly in the impingement structure configured as an exhaust gas mixer, with the result that the exhaust gas flow leaves the impingement structure at an outlet side with a homogeneous distribution of liquid additive.

In one preferred design variant, the impingement structure has an impingement component that forms the impingement region. The impingement component can be configured, for example, by at least one grille, a screen and/or a panel and can span the cross section of the exhaust gas line. The exhaust gas mixer can be arranged downstream of the impingement component in the flow direction. The exhaust gas mixer can be fastened to the impingement component.

A combination of a flow straightener and an exhaust gas mixer is also possible as an impingement structure. For example, first of all an exhaust gas mixer can be arranged behind one another in the flow direction, on which exhaust gas mixer the impingement region is also arranged. The exhaust gas mixer then brings about a particularly homogeneous distribution of the liquid additive in the exhaust gas flow downstream of the impingement region. This can be adjoined by a flow straightener that homogenizes the turbulence, caused by the exhaust gas mixer, in the exhaust gas flow again and generates a homogeneous flow distribution over the entire cross section of the exhaust gas line section, with the result that the exhaust gas flow downstream of the flow straightener is largely independent of the influence of the exhaust gas mixer. Here, a homogeneous flow distribution is distinguished by the fact that the flow speed of the exhaust gas on at least 80 percent of the area of the impingement structure corresponds to at least 90 percent of a mean flow speed. It is also possible that the impingement structure first of all has a flow straightener and subsequently an exhaust gas mixer in the flow direction. The impingement region is then arranged on the flow straightener. After the exhaust gas has flowed through the flow straightener, it is thoroughly mixed by the exhaust gas mixer.

An exhaust gas mixer can likewise be of conical configuration; a small end side of a conical exhaust gas mixer should be oriented toward the metering unit. The exhaust gas flow, which strikes the conical exhaust gas mixer, can then be widened (as in the case of a conical flow straightener), in order that it is again distributed approximately homogeneously over the entire cross section of an exhaust gas line.

The described exhaust gas line section is particularly advantageous if the flow guiding structure is a nozzle.

By way of a nozzle, an exhaust gas flow can be focused onto an impingement region that is substantially smaller than a cross section of the exhaust gas line section. A nozzle can be inserted into the exhaust gas line section, for example, as a component that is conical (at least in sections). A nozzle can also be configured partially by a wall of the exhaust gas line section. For example, a nozzle can be configured by a constriction in sections of the exhaust gas line section. A constriction of the exhaust gas line section that acts as a nozzle is preferably distinguished by the fact that the cross section of the exhaust gas line section decreases constantly in the throughflow direction (at least in one region). The exhaust gas flow is accelerated in the region. This is then followed by a constriction that acts like a throttle in the exhaust gas line. Subsequently, the cross section is enlarged suddenly, with the result that the focused exhaust gas flow is surrounded by an outer region, in which the exhaust gas does not flow or flows only slowly. A particularly effective acceleration and concentration of the exhaust gas flow onto an impingement region can thus be achieved. Moreover, no additional component is necessary in order to provide a nozzle. A flow guiding structure configured as a nozzle is particularly advantageous which tapers toward the metering unit with a shape, in which the cross section of the nozzle first of all tapers greatly and subsequently to a less pronounced extent (decreasing) in the throughflow direction. Particularly satisfactory focusing of the exhaust gas flow is achieved by way of a nozzle of this type, with the result that a desired flow distribution can be set particularly precisely. At the same time, it can be achieved by way of a nozzle that the exhaust gas flow that enters via the inflow side is directed and/or calmed.

The exhaust gas line section is advantageous, furthermore, if the flow guiding structure is a diffuser.

A diffuser means an extension and, in particular, a conical extension of the cross section of the exhaust gas line section. Widening of the exhaust gas flow can be achieved with the aid of a diffuser. A diffuser generates a homogeneous exhaust gas flow. If a diffuser is used as a flow guiding structure, the impingement region is preferably arranged on the entire cross-sectional area of an impingement structure or on a very large proportion of a cross-sectional area of the impingement structure. No peripheral region or only a very small peripheral region then preferably exists.

A diffuser as flow guiding structure is advantageous, in particular, when the exhaust gas flow enters into the exhaust gas line section with an inhomogeneous inlet flow distribution. An inlet flow distribution of this type arises, in particular, when an angular offset of the exhaust gas line is arranged upstream of the flow guiding structure in the throughflow direction. An angular offset typically has an angle, about which the exhaust gas line deviates or is curved. The tighter the radius of the angular offset, the more the exhaust gas flow is deflected toward a wall of the exhaust gas line, which typically results in a region with a greatly increased exhaust gas flow speed. The exhaust gas flow speed is braked overall by a diffuser. The exhaust gas flow therefore has more time on the path from the flow guiding structure toward the impingement structure, in order that the exhaust gas flow speed can be equalized over the entire cross section of the exhaust gas line. Particularly homogeneous incident flow of an impingement region with a corresponding flow distribution can thus be achieved. By way of a diffuser, a flow distribution in the exhaust gas line section becomes substantially independent of the angle and the radius of an angular offset of an exhaust gas line arranged upstream of the exhaust gas line section in the exhaust gas flow direction.

In a further design variant, the impingement structure does not extend over the entire cross section of the exhaust gas line section. The impingement structure spans merely the impingement region. The exhaust gas flow can flow around the impingement structure on the outside around the impingement region (in the peripheral region). The impingement structure is then supported in the exhaust gas line section, for example, by way of supporting structures.

Moreover, it is advantageous if the flow guiding structure has an inlet diameter and an outlet diameter, at least the inlet diameter or the outlet diameter being between 50 percent and 90 percent, preferably between 70 percent and 80 percent, of a line diameter of the exhaust gas line section.

The line diameter of the exhaust gas line section is preferably measured in the region of the metering unit. A possible increase or decrease in size of the line diameter by way of an indentation or protuberance of the exhaust gas line section in the region of the metering unit is not taken into consideration here. The line diameter is preferably a mean line diameter that the exhaust gas line section has or the diameter of a cylindrical basic shape of the exhaust gas line section in the region of the metering unit.

The specified orders of magnitude for the inlet diameter or for the outlet diameter can be used both if the flow guiding structure is a diffuser and if the flow guiding structure is a nozzle. In the case of a nozzle, the outlet diameter preferably lies in the specified range between 50 percent and 90 percent, or between 70 percent and 80 percent of the line diameter, whereas the inlet diameter corresponds to the line diameter. In the case of a diffuser, the inlet diameter preferably lies in the specified range between 50 percent and 90 percent, or between 70 percent and 80 percent, whereas the outlet diameter corresponds to the line diameter.

Furthermore, the exhaust gas line section is advantageous if the impingement structure has a hydrolysis coating in the impingement region.

The impingement structure preferably has a hydrolysis coating only in the impingement region, whereas no coating or a different coating is provided, for example, outside the impingement region. The hydrolysis coating in the impingement region can achieve a situation where liquid additive that strikes the impingement structure is converted particularly effectively into ammonia. (Practically) no liquid additive or only very little liquid additive strikes the impingement structure in the peripheral region, with the result that a coating might be saved there. Moreover, a flow resistance of the impingement structure to a throughflow with exhaust gas is reduced. The hydrolysis coating constricts the ducts of the impingement structure at least partially. This increases the flow resistance of the impingement structure.

Furthermore, the exhaust gas line section is advantageous if the impingement structure is a honeycomb body with ducts, through which the exhaust gas can flow, deflection faces for influencing an exhaust gas flow being provided in the ducts.

A honeycomb body can be both a flow straightener and an exhaust gas mixer. The described deflection faces can be configured in the ducts of the honeycomb body for thorough mixing. The more deflection faces that are provided, the greater the action of a honeycomb body as an exhaust gas mixer. A honeycomb body having a very small number of deflection faces and ducts that extend in a straight line (without a curve or in parallel) from an inflow side to an outflow side can act as a flow straightener. A honeycomb body is a particularly effective possibility for realizing a flow straightener or an exhaust gas mixer. A further feature of a honeycomb body that acts as an exhaust gas mixer is openings that connect the ducts of the honeycomb body to one another. These are openings in the duct walls of the honeycomb body. Thorough mixing and redistribution of the exhaust gas flow over the cross-sectional area of the honeycomb body can take place by way of openings of this type. A honeycomb body is preferably manufactured from at least one at least partially structured (corrugated) metallic layer that forms ducts that extend from an inflow side to an outflow side of the honeycomb body. Deflection faces can be provided as a structure in the metallic layers of the honeycomb body. Openings for connecting the ducts among one another can be configured as openings in the metallic layers of the honeycomb body.

A conical flow straightener can be configured as a conical honeycomb body. A combination of an exhaust gas mixer and a flow straightener can be provided by a honeycomb body configured in sections with deflection faces and openings in the duct walls and in sections with ducts without deflection faces and openings of this type.

Furthermore, the exhaust gas line section is advantageous if in each case one flange is arranged on the exhaust gas line section upstream of the flow guiding structure and/or downstream of the impingement structure in the throughflow direction, by way of which flange the exhaust gas line section can be connected to further components of an exhaust gas treatment device.

The exhaust gas line section can preferably be connected to further exhaust gas line sections of the exhaust gas treatment device, in order to be integrated into an exhaust gas treatment device. Here, in one design variant, a flange means a structure that makes a screw connection to further line sections possible.

However, a flange can also be formed by an edge and/or a groove that make/makes welding or brazing to further line sections possible. An exhaust gas line section of this type having flanges is particularly suitable as a modular component of a universal mixing section that can be integrated into exhaust gas treatment devices of different designs. The fact of the addition of liquid additive in the exhaust gas line section then does not have to be taken into consideration in the design of further components of an exhaust gas treatment device. On its outflow side, the exhaust gas line section provides an exhaust gas flow that contains the liquid additive in finely atomized form and/or in gaseous form.

Furthermore, a motor vehicle is also proposed, having an internal combustion engine and an exhaust gas treatment device for purifying the exhaust gases of the internal combustion engine, the exhaust gas treatment device having an exhaust gas line section which is described here and by way of which a liquid additive can be supplied to the exhaust gas treatment device, and an SCR catalytic converter being provided in the exhaust gas treatment device and downstream of the exhaust gas line section in a throughflow direction of the exhaust gases through the exhaust gas treatment device.

By the liquid additive, the method of selective catalytic reduction for exhaust gas purification can be implemented in the SCR catalytic converter. A (single) injector is preferably provided on the exhaust gas line section, which injector assumes portioned metering of the liquid additive to the exhaust gas line section. The injector can be a constituent part of the metering unit of the exhaust gas line section, and the injector is supplied with liquid additive by a delivery unit for delivering the liquid additive. The delivery unit removes the liquid additive from a tank, in which the liquid additive is stored, and provides it to the injector via a line.

BRIEF DESCRIPTION OF THE DRAWINGS

The invention and the technical field will be explained in more detail below on the basis of the figures. The figures show particularly preferred exemplary embodiments, to which the invention is however not restricted. In particular, it should be noted that the figures and, in particular, the illustrated proportions are merely schematic. In the figures.

DETAILED DESCRIPTION OF THE PRESENTLY PREFERRED EMBODIMENTS

Figure 1:
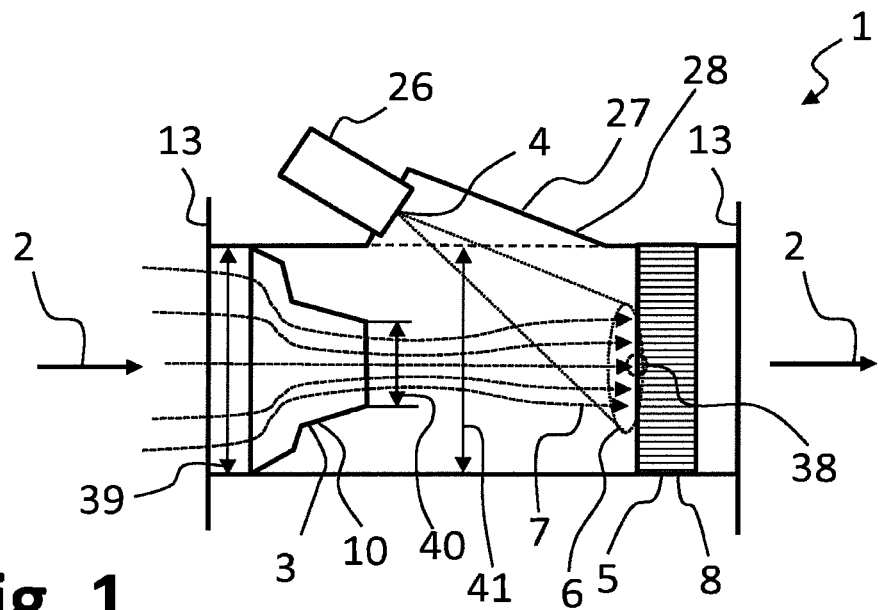
FIG. 1 shows a first design variant of an exhaust gas line section.

FIGS. 1 to 6 in each case show an exhaust gas line section 1 which can be flowed through by an exhaust gas flow with a throughflow direction 2. The exhaust gas line section 1 in each case has a substantially cylindrical basic shape formed by an outer wall 28 of the exhaust gas line section 1. First of all a flow guiding structure 3, subsequently a metering unit 4 and then an impingement structure 5 are situated one behind another on the exhaust gas line section 1 in the throughflow direction. In each case that the exhaust gas line sections 1 have flanges, by way of which the exhaust gas line sections can be connected to further components of an exhaust gas treatment device (not shown here). The flanges are configured by way of example as projecting collars which, for example, make a screw connection of the exhaust gas line sections 1 to further exhaust gas line sections possible. The metering unit 4 supplies the liquid additive to the exhaust gas line section 1 in each case in such a way that it strikes the impingement structure 5 in an impingement region 6. A flow distribution 7 with a centroid 38 is set on account of the flow guiding structure 3. The centroid lies in the impingement region 6. The flow distribution 7 preferably corresponds to the impingement region 6. The metering unit 4 in each case comprises a (single) injector 26 which provides the liquid additive in a portioned manner as required.

It is shown in FIG. 1 by way of example that the exhaust gas line section 1 has a line diameter 41. The flow guiding structure 3 has an inlet diameter 39 and an outlet diameter 40. In the present case, the inlet diameter 39 corresponds to the line diameter 41, whereas the outlet diameter 40 is smaller than the line diameter 41. This makes it possible to focus and accelerate an exhaust gas flow which passes the flow guiding structure 3. The specifications with respect to the line diameter 41, with respect to the inlet diameter 39 and with respect to the outlet diameter 40 can be carried over to the further design variants of an exhaust gas line section 1, which are shown in FIGS. 2 to 5.

In the design variants according to FIGS. 1, 2, 4, 5 and 6, the metering unit 4 is arranged in each case on a protuberance 27 of the exhaust gas line section 1. In the design variant according to FIG. 3, the metering unit 4 is arranged at an indentation 33 of the exhaust gas line section 1.

In the design variant according to FIG. 1, the flow guiding structure 3 is configured as a nozzle 10. The impingement structure 5 is configured there as a type of flow straightener 8.

Figure 2:
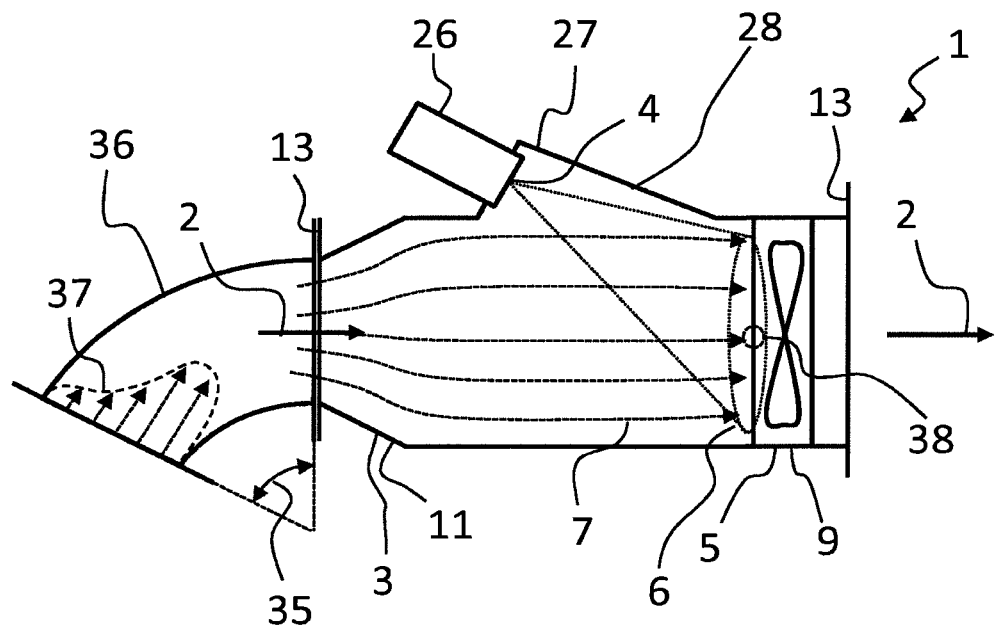
FIG. 2 shows a second design variant of an exhaust gas line section.

In the design variant according to FIG. 2, the flow guiding structure 3 is configured as a diffuser 11. The impingement structure 5 is configured as a type of exhaust gas mixer 9. An angular offset 36 adjoins the exhaust gas line section 1 upstream of the diffuser 11 in the throughflow direction 2. The angular offset 36 has an angle 35, at which an exhaust gas line deviates in the region of the angular offset 36. A diffuser 11 as flow guiding structure 3 is advantageous, in particular, when the exhaust gas flow enters into the exhaust gas line section 1 with an inhomogeneous inlet flow distribution 37. An inhomogeneous inlet flow distribution 37 occurs, in particular, when an angular offset of the exhaust gas line is arranged upstream of the flow guiding structure 3 in the throughflow direction.

Figure 3:
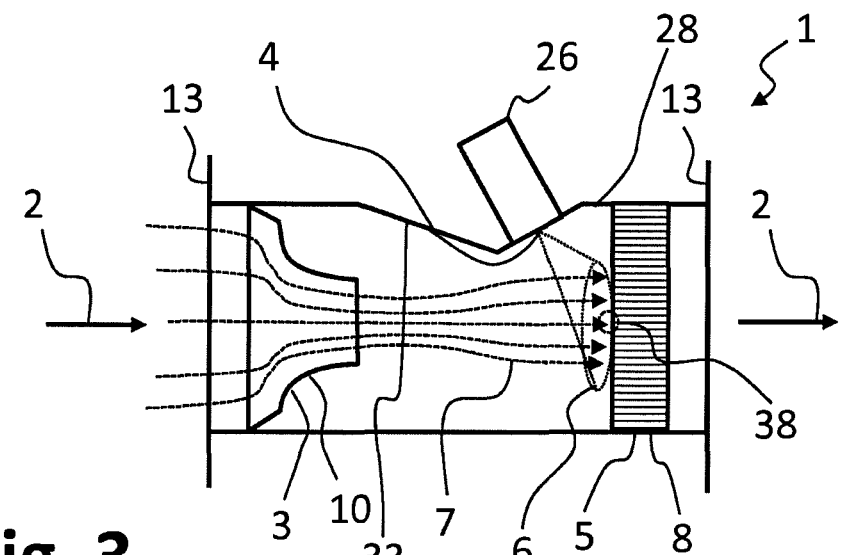
FIG. 3 shows a third design variant of an exhaust gas line section.

The design variant according to FIG. 3 corresponds substantially to the design variant according to FIG. 1, the metering unit not being arranged in a protuberance 27, however, but rather in an indentation 33. Moreover, the flow guiding structure 3, which is configured as a nozzle 10, tapers toward the metering unit 4 with a shape, in which the cross section of the nozzle 10 first of all tapers greatly and subsequently to a less pronounced extent (decreasing) in the throughflow direction 2.

Figure 4:
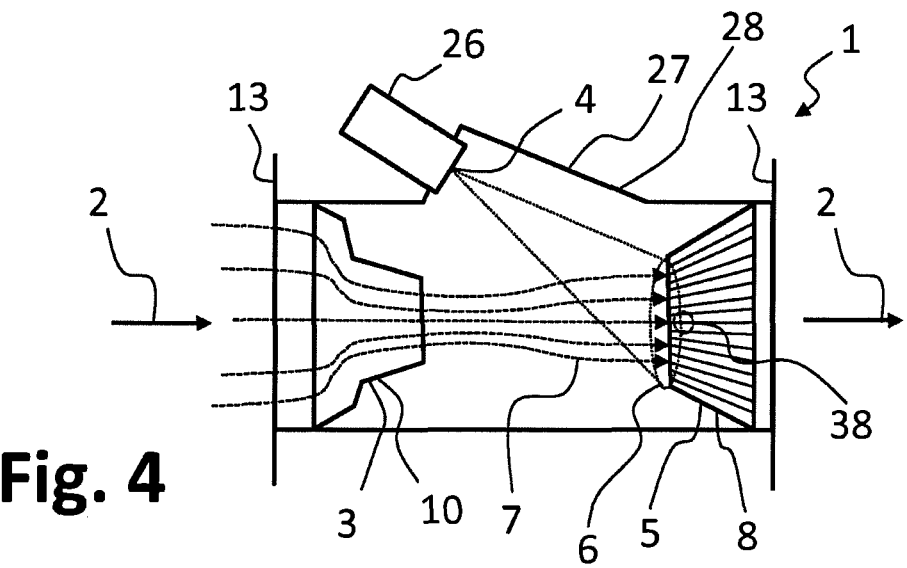
FIG. 4 shows a fourth design variant of an exhaust gas line section.

In the design variant according to FIG. 4, the impingement structure 5 is configured as a conical flow straightener 8.

Figure 5:
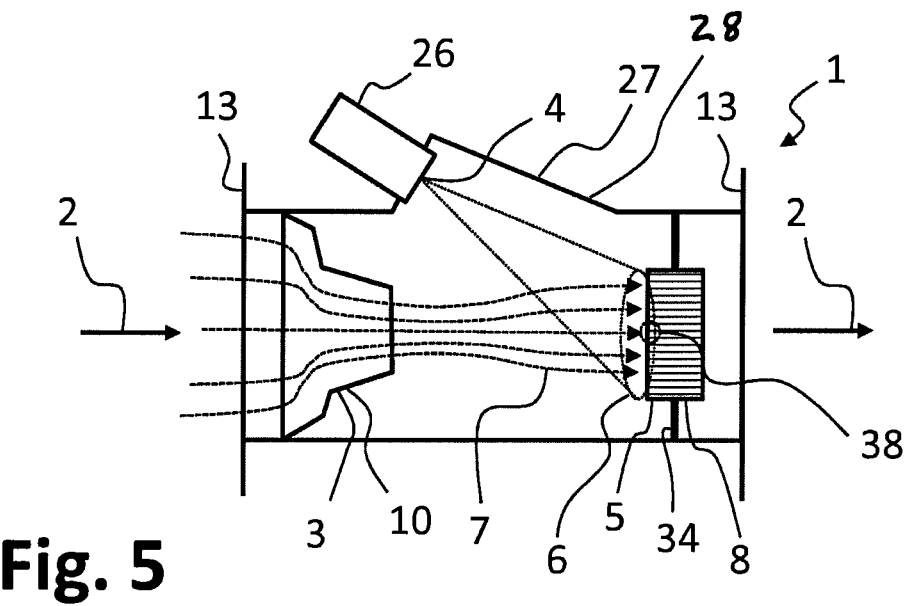
FIG. 5 shows a fifth design variant of an exhaust gas line section.

In the design variant according to FIG. 5, the impingement structure 5 is arranged only in the impingement region 6 and can be flowed around (freely) for the exhaust gas. The impingement structure 5 is supported by way of supporting structures 34 in the outer wall 28 of the exhaust gas line section 1.

Figure 6:
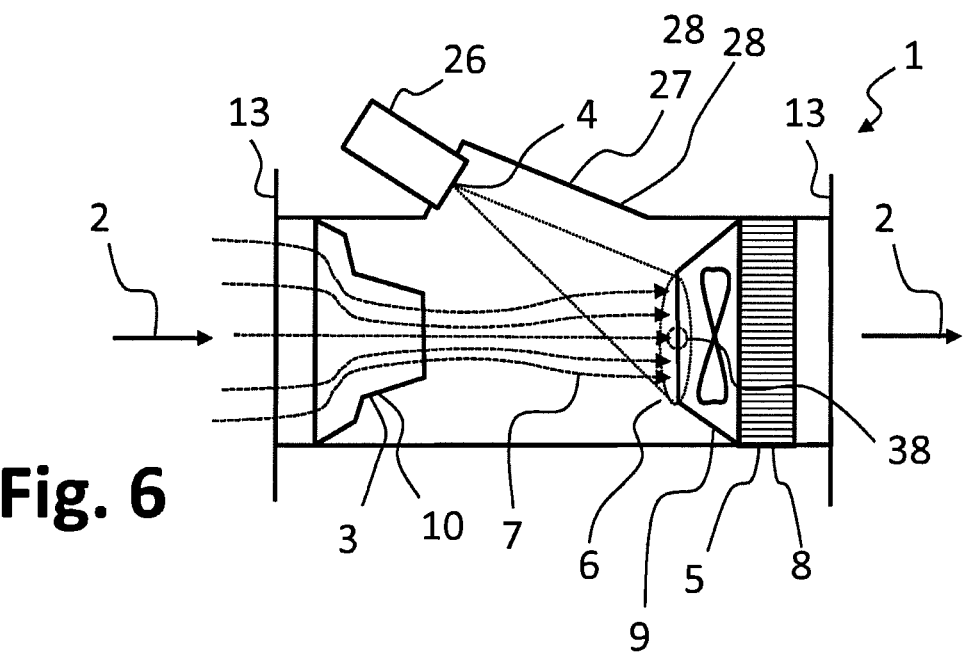
FIG. 6 shows a sixth design variant of an exhaust gas line section.

In the design variant according to FIG. 6, the impingement structure 5 is formed by an exhaust gas mixer 9 and by a flow straightener 8. Here, the exhaust gas mixer 9 is of conical configuration, in order that, starting from the impingement region 6, the exhaust gas flow is widened again and fills the exhaust gas line section 1 completely.

Figure 7:
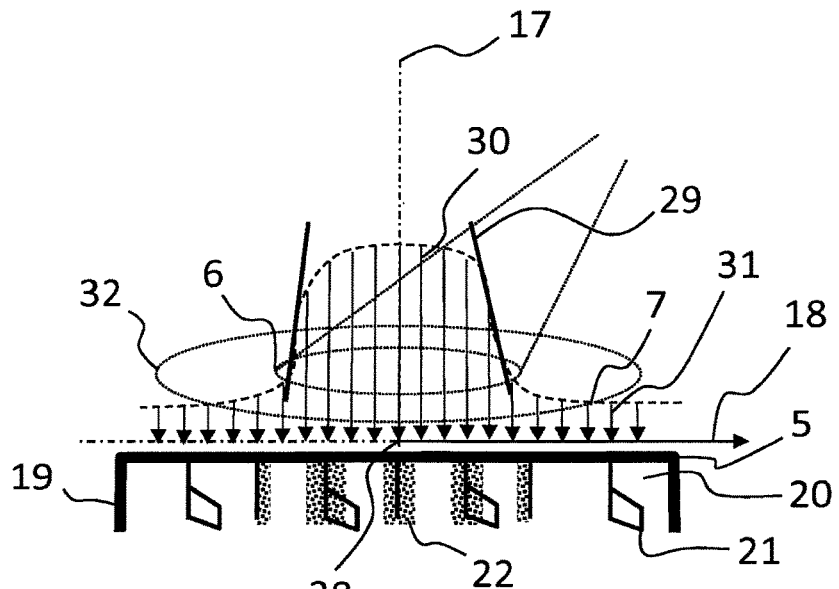
FIG. 7 shows an exhaust gas flow distribution which can be achieved by way of a described exhaust gas line section.

FIG. 7 diagrammatically shows a flow distribution 7 of the exhaust gas flow. A line axis 17 can be seen of an exhaust gas line section which is not shown here. The line axis 17 is a central axis of the exhaust gas line section. Moreover, a radial direction 18 can be seen which, starting from the line axis 17, extends to the outside. The flow distribution 7 has a first exhaust gas flow speed 30 in the impingement region 6, which is shown diagrammatically here, and a second exhaust gas flow speed in a peripheral region 32, which is arranged around the impingement region 6 on the outside. The impingement region 6 and the peripheral region 32 together form a surface of an impingement structure 5. The first exhaust gas flow speed 30 is preferably significantly greater than the second exhaust gas flow speed 31. Between the peripheral region 32 and the impingement region 6, the exhaust gas flow speed changes from the second exhaust gas flow speed 31 to the first exhaust gas flow speed 30, preferably with a steep flank 29, with the result that the flow distribution 7 corresponds to the impingement region 6 in a clearly recognizable manner.

In FIG. 7, it is additionally shown that the impingement structure 5 can be a honeycomb body 19 with ducts 20. It is also illustrated that deflection faces 21 can be arranged in the ducts 20. The exhaust gas flow which flows through the honeycomb body 19 is influenced in a targeted manner by way of deflection faces 21 of this type. It is likewise shown diagrammatically that the honeycomb body 19 is provided with a hydrolysis coating in the impingement region 6, whereas no hydrolysis coating (or no coating) is provided in the peripheral region 32. FIG. 7 shows merely a section of the honeycomb body 19 which forms the impingement structure 5. The honeycomb body 19 can continue yet further in the exhaust gas flow direction.

Figure 8:
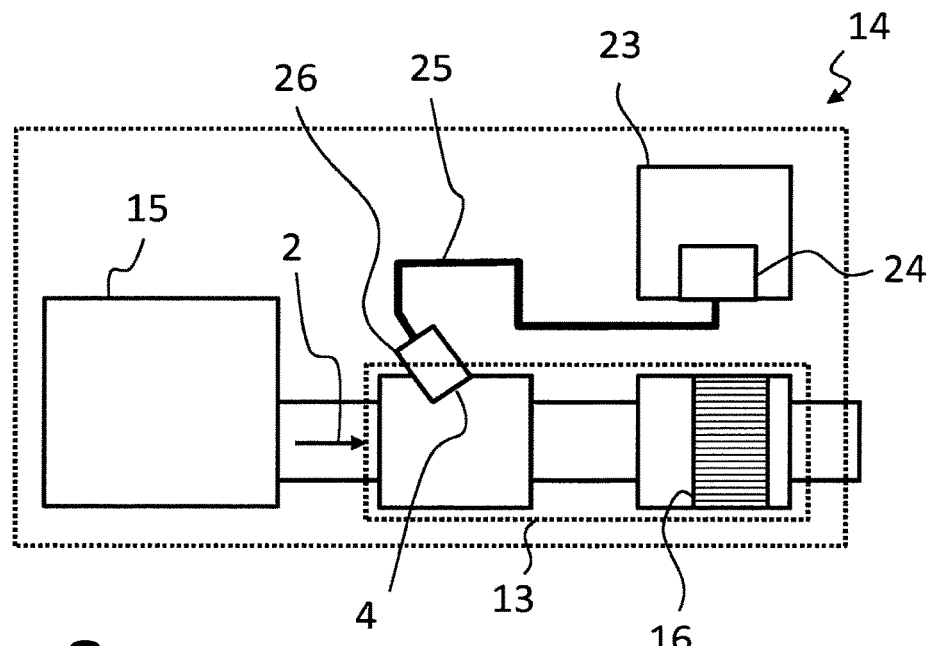
FIG. 8 shows a motor vehicle, having a described exhaust gas line section.

FIG. 8 shows a motor vehicle 14, having an internal combustion engine 15 and an exhaust gas treatment device 13 for the purification of the exhaust gases of the internal combustion engine 15. A described exhaust gas line section 1 for metering a liquid additive and an SCR catalytic converter 16 can be arranged in the exhaust gas treatment device 13. The exhaust gas line section 1 has a metering unit 4, which comprises an injector 26. The injector 26 is supplied with liquid additive from a tank 23, the liquid additive from the tank 23 being delivered via a line 25 to the injector 26 by a delivery unit 24.

It is obvious to a person skilled in the art that the technical features which are illustrated in the figures can also be extracted and/or can be combined with technical features of other figures. It is noted here as a precaution that, although the combinations of features shown in the individual figures are preferred, they are nevertheless not compulsory.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An exhaust gas line section (1) through which an exhaust gas flows along a throughflow direction (2), comprising:
   a flow guiding structure (3);
   a metering unit (4) configured to feed a liquid additive to the exhaust gas; and
   an impingement structure (5) through which the exhaust gas flow can pass, the flow guiding structure (3), the metering unit (4) and the impingement structure (5) being arranged behind one another along the throughflow direction (2),
   wherein the metering unit (4) and the flow guiding structure (3) are arranged and configured such that an impingement region (6), which is the region of the impingement structure (5) on which the liquid additive impinges on the impingement structure (5), overlaps with a centroid (38) of a flow distribution (7) of the exhaust gas that flows through the impingement structure (5), and wherein the impingement structure (5) is arranged only in the impingement region (6) such that the cross-sectional area of the impingement structure (5) is equal to the cross-sectional area of the impingement region (6), so that exhaust gas can freely flow around the impingement structure (5), the exhaust gas line section (1) further comprising supports (34) arranged to extend from an outer wall (28) of the exhaust gas line section (1), the supports (34) being configured to support the impingement structure (5).

2. The exhaust gas line section (1) as claimed in claim 1, wherein the metering unit (4) and the flow guiding structure (3) are arranged and configured such that the impingement region (6) corresponds to the flow distribution (7).

3. The exhaust gas line section (1) as claimed in claim 1, wherein the impingement structure (5) comprises a flow straightener (8).

4. The exhaust gas line section (1) as claimed in claim 1, wherein the flow guiding structure (3) comprises a nozzle (10).

5. The exhaust gas line section (1) as claimed in claim 1, wherein the flow guiding structure (3) comprises a diffuser (11).

6. The exhaust gas line section (1) as claimed in claim 1, wherein the flow guiding structure (3) has an inlet diameter (39) and an outlet diameter (40), at least the inlet diameter (39) or the outlet diameter (40) being between 50 percent and 90 percent of a line diameter (41) of the exhaust gas line section (1).

7. The exhaust gas line section (1) as claimed in claim 1, wherein the impingement structure (5) has a hydrolysis coating (22) in the impingement region (6).

8. The exhaust gas line section (1) as claimed in claim 1, wherein the impingement structure (5) comprises a honeycomb body (19) having ducts (20), through which the exhaust gas can flow, the ducts (20) having, provided therein, deflection faces (21) configured to influence the exhaust gas flow.

9. A motor vehicle (14), comprising:
an internal combustion engine (15);
an exhaust gas treatment device (13) configured to purify exhaust gases of the internal combustion engine (15), the exhaust gas treatment device (13) having the exhaust gas line section (1) as claimed in claim 1, by which exhaust gas line section (1) a liquid additive can be fed to the exhaust gas treatment device (13); and
an SCR catalytic converter (16) provided downstream of the exhaust gas line section (1) in the exhaust gas treatment device (13) in a throughflow direction (2) of the exhaust gases flowing through the exhaust gas treatment device (13).

10. An exhaust gas line section (1) through which an exhaust gas flows along a throughflow direction (2), comprising:
a flow guiding structure (3);
a metering unit (4) configured to feed a liquid additive to the exhaust gas; and
an impingement structure (5) through which the exhaust gas flow can pass, the flow guiding structure (3), the metering unit (4) and the impingement structure (5) being arranged behind one another along the throughflow direction (2),
wherein the metering unit (4) and the flow guiding structure (3) are arranged and configured such that an impingement region (6) of the liquid additive on the impingement structure (5) overlaps with a centroid (38) of a flow distribution (7) of the exhaust gas that flows through the impingement structure (5), and
wherein the impingement structure (5) comprises an exhaust gas mixer (9) and a flow straightener (8), the exhaust gas mixer (9) being of a frustoconical configuration such that the exhaust gas flow defined by the frustoconical exhaust gas mixer (9) is widened from an outer edge of a face of the frustoconical exhaust gas mixer (9) that comprises the impingement region until it fills the exhaust gas line (1) section completely, the exhaust gas mixer (9) being arranged with respect to the metering unit (4) so that impingement of reactant sprayed from the metering unit (4) occurs over the entire face of the frustoconical exhaust gas mixer (9) that comprises the impingement region.

* * * * *